US010025308B1

(12) United States Patent
Poursohi et al.

(10) Patent No.: US 10,025,308 B1
(45) Date of Patent: Jul. 17, 2018

(54) SYSTEM AND METHOD TO OBTAIN AND USE ATTRIBUTE DATA

(71) Applicant: Google LLC, Mountain View, CA (US)

(72) Inventors: Arshan Poursohi, San Francisco, CA (US); Greg Klein, Cupertino, CA (US); Daniel Aden, Redwood City, CA (US); Matthew Amacker, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 237 days.

(21) Appl. No.: 15/048,109

(22) Filed: Feb. 19, 2016

(51) Int. Cl.
G01C 22/00 (2006.01)
G05D 1/00 (2006.01)
G05D 1/02 (2006.01)
B25J 5/00 (2006.01)

(52) U.S. Cl.
CPC .............. G05D 1/0088 (2013.01); B25J 5/00 (2013.01); G05D 1/0246 (2013.01); *Y10S 901/01* (2013.01)

(58) Field of Classification Search
CPC ....... G05D 1/0088; G05D 1/0246; B25J 5/00; Y10S 901/01
USPC .......................................................... 701/28
See application file for complete search history.

(56) References Cited

U.S. PATENT DOCUMENTS

| 7,831,087 | B2 | 11/2010 | Harville |
| 8,577,126 | B2 | 11/2013 | Jones et al. |
| 8,824,737 | B2 | 9/2014 | Gurman et al. |
| 8,971,635 | B2 | 3/2015 | Kodaira et al. |
| 8,994,790 | B2 | 3/2015 | Ganapathi et al. |
| 9,072,929 | B1 | 7/2015 | Rush et al. |
| 9,079,311 | B2 | 7/2015 | Wang et al. |
| 9,098,738 | B2 | 8/2015 | Bilet et al. |
| 9,317,741 | B2 | 4/2016 | Guigues et al. |

(Continued)

FOREIGN PATENT DOCUMENTS

WO 2015040503 A1 3/2015

OTHER PUBLICATIONS

Musleh et al., "Identifying and Tracking Pedestrians Based on Sensor Fusion and Motion Stability Predictions", Sensors, Sep. 2010.*

(Continued)

*Primary Examiner* — Aaron L Troost
*Assistant Examiner* — Paula L Schneider
(74) *Attorney, Agent, or Firm* — McDonnell Boehnen Hulbert & Berghoff LLP

(57) ABSTRACT

Example systems and methods are disclosed for associating detected attributes with an actor. An example method may include receiving point cloud data for a first actor at a first location within the environment. The method may include associating sensor data from an additional sensor with the first actor based on the sensor data being representative of the first location. The method may include identifying one or more attributes of the first actor based on the sensor data. The method may include subsequently receiving a second point cloud representative of a second actor at a second location within the environment. The method may include determining, based on additional sensor data from the additional sensor, that the second actor has the one or more attributes. The method may include providing a signal indicating that the first actor is the second actor based on the second actor having the one or more attributes.

20 Claims, 7 Drawing Sheets

(56) References Cited

U.S. PATENT DOCUMENTS

| | | |
|---|---|---|
| 9,418,475 B2 | 8/2016 | Medioni et al. |
| 9,618,602 B2 | 4/2017 | Bridges et al. |
| 9,691,153 B1 | 6/2017 | Byrne et al. |
| 9,804,696 B2 | 10/2017 | Hall |
| 9,811,166 B2 | 11/2017 | Bell et al. |
| 2002/0118274 A1 | 8/2002 | Yahashi |
| 2004/0153671 A1* | 8/2004 | Schuyler .............. G07C 9/00 726/9 |
| 2010/0111370 A1 | 5/2010 | Black et al. |
| 2012/0075464 A1 | 3/2012 | Derenne et al. |
| 2012/0182392 A1* | 7/2012 | Kearns .............. B25J 11/009 348/46 |
| 2013/0148853 A1 | 6/2013 | Hwang et al. |
| 2013/0181892 A1 | 7/2013 | Liimatainen et al. |
| 2013/0182905 A1 | 7/2013 | Myers et al. |
| 2013/0190086 A1 | 7/2013 | Maison et al. |
| 2013/0286012 A1 | 10/2013 | Medioni et al. |
| 2013/0289449 A1 | 10/2013 | Stone et al. |
| 2014/0049769 A1* | 2/2014 | Zheleznyak ............ G01S 17/89 356/28 |
| 2015/0088310 A1 | 3/2015 | Pinter et al. |
| 2015/0298317 A1 | 10/2015 | Wang et al. |
| 2016/0081594 A1 | 3/2016 | Gaddipati et al. |
| 2016/0117859 A1 | 4/2016 | Perbet et al. |
| 2016/0253807 A1 | 9/2016 | Jones et al. |
| 2016/0266256 A1* | 9/2016 | Allen .................. G01S 17/89 |
| 2017/0263002 A1 | 9/2017 | Byrne et al. |

OTHER PUBLICATIONS

Takeuchi, "Design of a 3D Interface using a Markerless Paper in Augmented Reality Environments", University of Tokyo, Feb. 6, 2013.

* cited by examiner

SYSTEM AND METHOD TO OBTAIN AND USE ATTRIBUTE DATA

BACKGROUND

Physical spaces may be used for retail, manufacturing, assembly, distribution, office space, and/or other purposes. The design and operation of these physical spaces is becoming more intelligent, more efficient, and more intuitive. As technology becomes increasingly prevalent in modern life, using technology to enhance physical spaces becomes more apparent. Thus, a demand for enhanced physical spaces has increased innovation in sensing techniques, data processing, software, and user interface design.

SUMMARY

Example systems and methods may provide for associating detected attributes with an actor. The environment may include depth sensors, such as LIDAR sensors, that receive point cloud data representative of an actor at a location. The environment may also include additional sensors, such as image capture devices, that receive additional sensor data that provides attribute data about the actor. The point cloud data and additional sensor data may be used in combination to determine information about the actor, such as a current location.

For example, the system may receive LIDAR sensor point cloud data and image data representative of an actor at a first location. The system may analyze the image data and determine attributes about the first actor, such as a shirt color, facial features, and/or other attributes. Later on, the system may receive additional point cloud data and image data of a second actor at a second location. The system may analyze the image data of the second actor and determine that the second actor has the same attributes as the first actor (such as the same shirt color, same facial features, and/or other attributes). The system may then determine that the second actor is the first actor based on the matching attributes. The system may update the location of the first actor to be the second location. Other examples are possible.

In one example, a method is provided that includes receiving, from at least one depth sensor, a first point cloud representative of a first actor at a first location within an environment. The method may also include associating sensor data from at least one additional sensor with the first actor based on the sensor data from the at least one additional sensor being representative of the first location within the environment. The method may additionally include identifying one or more attributes of the first actor based on the associated sensor data. The method may also include subsequently receiving, from the at least one depth sensor, a second point cloud representative of a second actor at a second location within the environment. The method may further include determining, based on additional sensor data from the at least one additional sensor, that the second actor has the one or more attributes. The method may even further include providing a signal indicating that the first actor is the second actor at the second location within the environment based on determining that the second actor has the one or more attributes.

In an additional example, a non-transitory computer readable medium is provided that stores instructions that are executable by one or more computing devices. When the instructions are executed, the instructions cause the one or more computing devices to perform functions that include receiving, from at least one depth sensor, a first point cloud representative of a first actor at a first location within an environment. The functions may also include associating sensor data from at least one additional sensor with the first actor based on the sensor data from the at least one additional sensor being representative of the first location within the environment. The functions may also include identifying one or more attributes of the first actor based on the associated sensor data. The functions may also include subsequently receiving, from the at least one depth sensor, a second point cloud representative of a second actor at a second location within the environment. The functions may further include determining, based on additional sensor data from the at least one additional sensor, that the second actor has the one or more attributes. The functions may include providing a signal indicating that the first actor is the second actor at the second location within the environment based on determining that the second actor has the one or more attributes.

In another example, a robotic device is disclosed that includes one or more processors and a memory that stores instructions that are executed by the one or more processors. When executed, the instructions cause the robotic device to perform functions that include receiving, from at least one depth sensor, a first point cloud representative of a first actor at a first location within an environment. The functions may also include associating sensor data from at least one additional sensor with the first actor based on the sensor data from the at least one additional sensor being representative of the first location within the environment. The functions may also include identifying one or more attributes of the first actor based on the associated sensor data. The functions may also include subsequently receiving, from the at least one depth sensor, a second point cloud representative of a second actor at a second location within the environment. The functions may further include determining, based on additional sensor data from the at least one additional sensor, that the second actor has the one or more attributes. The functions may even further include determining that the first actor is the second actor at the second location within the environment based on determining that the second actor has the one or more attributes. The functions may also include adjusting operation of the robotic device based on determining that the first actor is the second actor at the second location within the environment In a further example, a system may include means for receiving, from at least one depth sensor, a first point cloud representative of a first actor at a first location within an environment. The system may also include means for associating sensor data from at least one additional sensor with the first actor based on the sensor data from the at least one additional sensor being representative of the first location within the environment. The system may additionally include means for identifying one or more attributes of the first actor based on the associated sensor data. The system may also include means for subsequently receiving, from the at least one depth sensor, a second point cloud representative of a second actor at a second location within the environment. The system may further include means for determining, based on additional sensor data from the at least one additional sensor, that the second actor has the one or more attributes. The system may even further include means for providing a signal indicating that the first actor is the second actor at the second location within the environment based on determining that the second actor has the one or more attributes.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
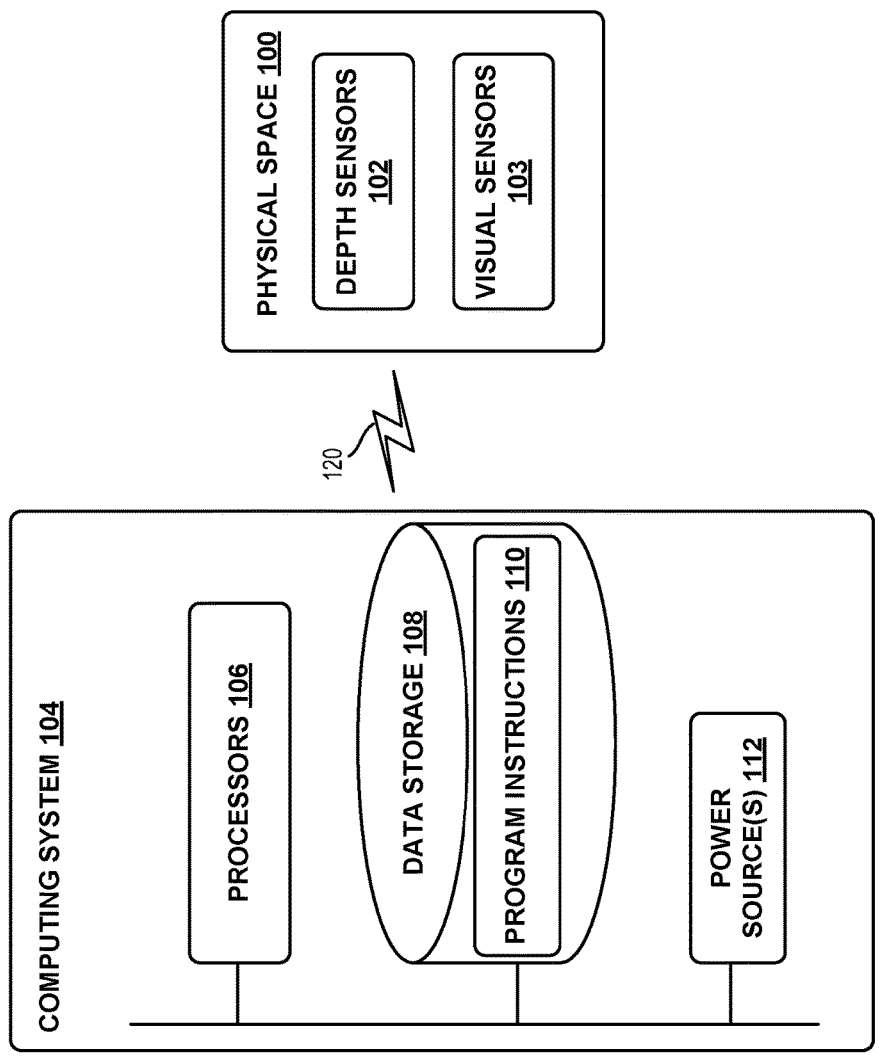
FIG. 1 illustrates a configuration of a system for associating detected attributes with an actor in an environment, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

For a system that detects actors (such as people, robots, etc.) within a space (such as a 20 meter by 20 meter room), it may be useful to monitor the location of a detected actor at different points in time. It may also be useful to further identify attributes of detected actors within the space. Executing these tasks, however, may be challenging for at least three reasons.

First, the system may detect actors within the space using point cloud data (such as sensor data from LIDAR sensors) that provides limited information about the person. Second, the collected sensor data may be sparse: there may not be many data points collected by the system. Third, the sensors may be unable to detect actors within the space in certain situations. For example, the actor may be in a location within the space where a sensor isn't installed. For another example, the sensors may be obstructed from sensing a particular actor by another actor or an object (such as a wall). Thus, it may be challenging to monitor the location and identify attributes of actors within the space.

To overcome these challenges, a method may be executed by a system relying on one or more LIDAR sensors and one or more additional sensors (such as cameras). The system may detect an actor at different locations in the space by attaching detected attributes to the actor. The method may begin by receiving point cloud data representative of the actors within the space from the LIDAR sensors within the space. The method may continue by receiving sensor data from different types of sensors (such as cameras) for the detected actors within the space. The system may then determine one or more attributes of the actor based on the received sensor data. Next, the system may use the attributes in combination with the received point cloud data for the actor to detect the actor at different locations within the space. By using attributes and point cloud data, the system may better detect actors at different times and locations within the space.

The system may rely on one or more LIDAR sensors to acquire point cloud data about the actors within the space. In some embodiments, the system may rely on a different type of sensor (such as different depth sensors, thermal camera sensors, etc.) instead of LIDAR sensors to detect the actor. The point cloud data may include a plurality of points, each of which represents a point on the surface of the detected person. The LIDAR data acquired may be sparse, in some embodiments. Further, LIDAR sensors may not be located everywhere throughout the space, thus leading to undetected portions of the space and/or non-uniform density. Because of these issues, using additional sensors may provide enhanced detection and identification of actors within the space by the system.

While the system may rely on cameras to provide sensor data for determining attributes, other types of sensors are also possible. For example, the system may rely on various types of sensors including badge readers, microphones, iris scanners, fingerprint scanners, IMUs, and/or other types of devices to receive sensor data. Depending on the sensor, the system may determine various attributes, including facial features, clothing color, badge numbers, voice data, motion detection data, and/or other attributes. Some attributes may be assigned an expiration time. These attributes (such as gaze direction, momentum, what an actor recently said, who an actor recently interacted with, etc.) are only used to identify actors prior to corresponding expiration times of the attributes. Other types of attributes may also be identified.

The system may rely on sensor data to better detect and identify actors within the space. For detection, the LIDAR sensors may not be able to detect an actor in every portion of the space. In some parts of the space, a LIDAR sensor may not be present for various reasons (monetary costs, privacy, physically impossible or impractical, etc.). Alternatively, a LIDAR sensor may be blocked from detecting a person due to the presence of an object, another actor, or some other obstacle. LIDAR sensors may be unable to detect an actor within the space for other reasons as well.

Additional sensors (such as cameras) can better detect actors that are undetected by LIDAR sensors in at least two ways. First, cameras may be present to detect actors in locations undetected by LIDAR sensors. Thus, cameras can be used to detect actors and determine information about the actors (such as location). Second, image data received from cameras can be used to determine attributes (such as a shirt color) about actors. The determined attributes may be helpful for identifying actors that are moving between areas detected by LIDAR sensors and areas that are not detected by LIDAR sensors.

For example, the system may initially detect and determine a location for an actor based on point cloud data and assign an attribute to the actor based on received sensor data (e.g., the actor is wearing a green shirt). The actor may then briefly move to a location undetected by LIDAR sensors (such as a hallway) and at a later time return to a detected location (such as the original location). Because the system stopped detecting the actor (e.g., while the actor was in the hallway), the system may rely on attribute data (e.g., a green shirt) to determine that the detected point cloud corresponds to the actor. Thus, the second sensor can enable the system to detect actors in portions of the space undetected by LIDAR sensors and identify actors that previously went undetected by using attribute data.

The system may also rely on sensor data to identify actors within the space. For example, a badge reader may be used as an additional sensor to obtain and store a badge identification (ID) number as attribute data for the actor. Thus, when the system detects the actor in the space, the system also retrieves the badge ID number attribute data of the actor. The attribute data enables the actor to enter restricted areas without having to swipe his badge again. In particular, upon detection of the actor, the system retrieves the stored attribute data indicating the actor's badge ID number, and grants access to the restricted area upon verification of the badge ID number.

Identifying actors based on attribute data determined from received sensor data may be useful for other applications. For example, a robotic device operating in the space may use identification information about an actor within the space to execute tasks. Specifically, while the robot may be able to navigate the space by merely having information about the presence of an actor in the space, executing tasks involving telepresence (such as communicating with the actor) may be done by using identification information about the person. Improved identification and/or detection of actors may be useful for other applications.

FIG. 1 shows an example physical space 100 having one or more sensors 102-103. A physical space may define a portion of an environment in which people, objects, and/or machines may be located. The physical space may take on a two-dimensional or a three-dimensional form and may be used for various purposes. For instance, the physical space may be used as a retail space where the sale of goods and/or services is carried out between individuals (or businesses) and consumers. While various aspects of the disclosure are discussed below in the context of a general space, example implementations are not limited to general spaces and may extend to a variety of other physical spaces such as retail spaces, manufacturing facilities, distribution facilities, office spaces, shopping centers, festival grounds, and/or airports, among other examples. Although only one physical space 100 is shown in FIG. 1, example implementations may be carried out in the context of a plurality of physical spaces.

Example sensors in a physical space (e.g., one or more sensors 102-103) may include but are not limited to: force sensors, proximity sensors, motion sensors (e.g., an inertial measurement units (IMU), gyroscopes, and/or accelerometers), load sensors, position sensors, thermal imaging sensors, facial recognition sensors, depth sensors (e.g., RGB-D, laser, structured-light, and/or a time-of-flight camera), point cloud sensors, ultrasonic range sensors, infrared sensors, Global Positioning System (GPS) receivers, sonar, optical sensors, biosensors, Radio Frequency identification (RFID) systems, Near Field Communication (NFC) chip, wireless sensors, compasses, smoke sensors, light sensors, radio sensors, microphones, speakers, radars, touch sensors (e.g., capacitive sensors), cameras (e.g., color cameras, grayscale cameras, and/or infrared cameras), and/or range sensors (e.g., ultrasonic and/or infrared), among others.

Additionally, the sensors may be positioned within or in the vicinity of the physical space, among other possible locations. Further, an example implementation may also use sensors incorporated within existing devices such as mobile phones, laptops, and/or tablets. These devices may be in the possession of people located in the physical space such as consumers and/or employees within a retail space. Additionally or alternatively, these devices may be items on display, such as in a retail space used for selling consumer electronics. Yet further, each physical space 100 may include the same combination of sensors or different combinations of sensors.

FIG. 1 also depicts a computing system 104 that may receive data from the sensors 102-103 positioned in the physical space 100. In particular, the sensors 102-103 may provide sensor data to the computing system by way of communication link 120. Communication link 120 may include one or more wired links and/or wireless links (e.g., using various wireless transmitters and receivers). A wired link may include, for example, a parallel bus or a serial bus such as a Universal Serial Bus (USB). A wireless link may include, for example, Bluetooth, IEEE 802.11(IEEE 802.11 may refer to IEEE 802.11-2007, IEEE 802.11n-2009, or any other IEEE 802.11 revision), Cellular (such as GSM, GPRS, CDMA, UMTS, EV-DO, WiMAX, HSPDA, or LTE), or Zigbee, among other possibilities. Furthermore, multiple wired and/or wireless protocols may be used, such as "3G" or "4G" data connectivity using a cellular communication protocol (e.g., CDMA, GSM, or WiMAX, as well as for "Wi-Fi" connectivity using 802.11).

In other examples, the arrangement may include access points through which one or more sensors 102-103 and/or computing system 104 may communicate with a cloud server. Access points may take various forms such as the form of a wireless access point (WAP) or wireless router. Further, if a connection is made using a cellular air-interface protocol, such as a CDMA or GSM protocol, an access point may be a base station in a cellular network that provides Internet connectivity by way of the cellular network. Other examples are also possible.

Computing system 104 is shown to include one or more processors 106, data storage 108, program instructions 110, and power source(s) 112. Note that the computing system 104 is shown for illustration purposes only as computing system 104, but may include additional components and/or have one or more components removed without departing from the scope of the disclosure. Further, note that the various components of computing system 104 may be arranged and connected in any manner.

Each processor, from the one or more processors 106, may be a general-purpose processor or a special purpose processor (e.g., digital signal processors, application specific integrated circuits, etc.). The processors 106 can be configured to execute computer-readable program instructions 110 that are stored in the data storage 108 and are executable to provide the functionality of the computing system 104 described herein. For instance, the program instructions 110 may be executable to provide for processing of sensor data received from one or more sensors 102-103.

The data storage 108 may include or take the form of one or more computer-readable storage media that can be read or accessed by the one or more processors 106. The one or more computer-readable storage media can include volatile and/or non-volatile storage components, such as optical, magnetic, organic or other memory or disc storage, which can be integrated in whole or in part with the one or more processors 106. In some implementations, the data storage 108 can be implemented using a single physical device (e.g., one optical, magnetic, organic or other memory or disc storage unit), while in other implementations, the data storage 108 can be implemented using two or more physical devices. Further, in addition to the computer-readable program instructions 110, the data storage 108 may include additional data such as diagnostic data, among other possibilities. Further, the computing system 104 may also include one or more power source(s) 112 configured to supply power to various components of the computing system 104. Any type of power source may be used such as, for example, a battery. In some embodiments, the computing system 104 may include more, fewer, and/or different components than those shown in FIG. 1.

Figure 2A:
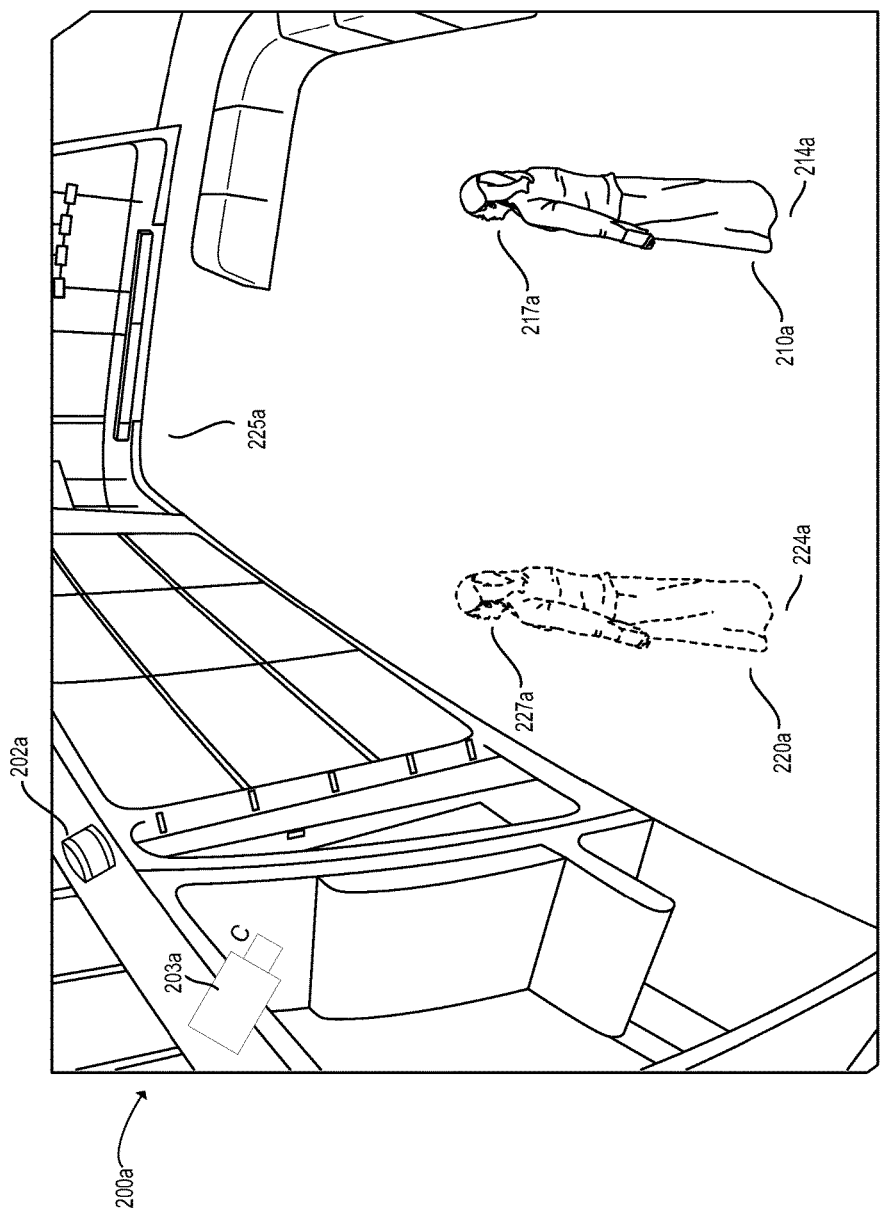
FIG. 2A illustrates an example environment with an actor, according to an example embodiment.
Figure 2B:
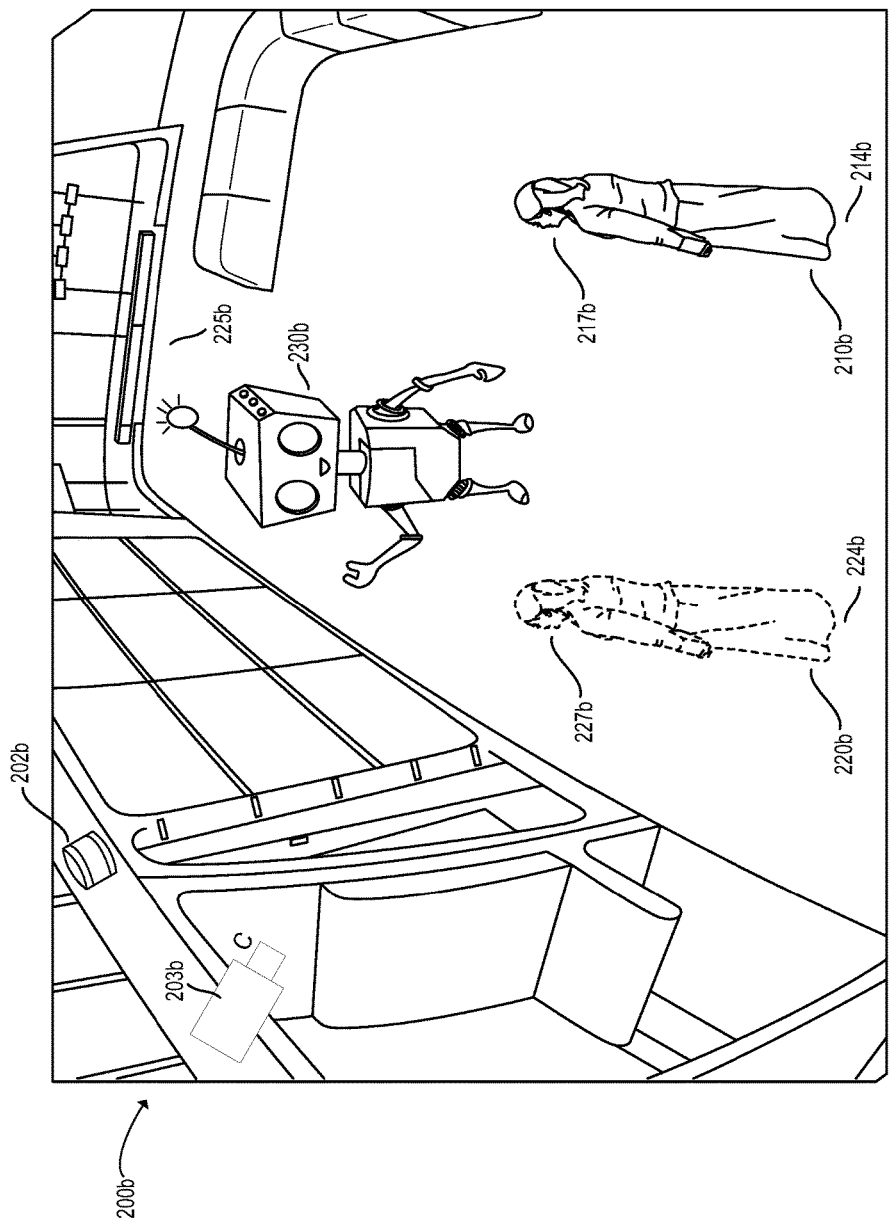
FIG. 2B illustrates another example environment with an actor and a robotic device, according to an example embodiment.

FIGS. 2A and 2B display example embodiments of an environment with one or more sensors. In FIG. 2A, the environment 200*a* includes a sensor 202*a*, a sensor 203*a*, a first actor 210*a* at a first location 214*a*, and a second actor 220*a* at a second location 224*a*. In FIG. 2B, the environment 200*b* includes a sensor 202*b*, a sensor 203*b*, an actor 210*b* at location 214*b*, and a robotic device 230*b*. In FIG. 2A, the first actor 210*a* has one or more attributes, such as gaze direction 217*a*, while the second actor 220*a* has also one or more attributes, such as gaze direction 227*a*. In FIG. 2B, the first actor 210*b* has one or more attributes, such as gaze direction 217*b*, while the second actor 220*b* has also one or more attributes, such as gaze direction 227*b*. In FIG. 2A, the second actor 220*a* is drawn in a dotted line because the actor 220*a* is detected at a later time than actor 210*a*, while in FIG. 2B, the second actor 220*b* is also drawn in a dotted line to indicate that the actor 220*b* is detected at a later time than actor 210*b*. In FIGS. 2A and 2B, more, fewer, and/or different objects may be included in environments 200*a* and/or 200*b*.

The environments 200*a* and 200*b* displayed in FIGS. 2A and 2B may correspond to one or more physical spaces. In the displayed embodiments, the environment corresponds to one physical space, such as physical space 100 described in FIG. 1. The physical space may be used for a variety of purposes, including retail, manufacturing, assembly, distribution, business, healthcare, and/or other purposes. In other embodiments, the environments 200*a* and/or 200*b* may include multiple physical spaces, with each physical space having one or more sensors, such as sensors 102 and 103 described in FIG. 1. For example, a home may be an environment with multiple rooms (bedroom, kitchen, bathroom, dining room, etc.) corresponding to multiple physical spaces, with each physical space having one or more sensors. Other embodiments of environments 200*a* and/or 200*b* may also be possible.

In FIGS. 2A and 2B, the sensors 202*a* and 202*b* are LIDAR sensors used to collect point cloud data of detected objects within the environment. Although a spinning LIDAR sensor is displayed, other types of sensors, including motion capture sensors, thermal imaging sensors, different types of LIDAR sensors, or other depth sensors, may be used instead to obtain point cloud data or other types of data for detecting objects. While the displayed embodiments only show one depth sensor, in other embodiments, multiple depth sensors may be located throughout the environment.

In FIGS. 2A and 2B, sensors 203*a* and 203*b* are image capture devices used to collect image data of locations in the environment. The image capture device may be a camera, including PTZ cameras (pan-tilt-zoom), stationary cameras, moving cameras, color cameras, grayscale cameras, and/or some other sensor that receives image data of a location. While the displayed embodiments only show one sensor receiving image data within the environment, in other embodiments, multiple sensors that receive image data of a location may be located throughout the environment. Further, the sensors 202*a*, 202*b*, 203*a*, and 203*b* may be stationary, moving, or some combination of the two while in the environment.

For example, sensor(s) 202*b* and/or 203*b* may be attached to a robotic device 230*b*. In this case, when the robotic device 230*b* is stationary, the attached sensor(s) 202*b* and/or 203*b* may also be stationary. However if the robotic device 230*b* is moving, then the attached sensor(s) 202*b* and/or 203*b* would also be moving. Alternatively, the sensors may be attached to fixed locations within the environment, as shown by sensors 202*a*, 202*b*, 203*a*, and 203*b* in FIGS. 2A and 2B, respectively. Sensors 202*a* and 202*b* obtain point cloud data of one or more detected actors at a location within the environment. Additional sensors 203*a* and 203*b* receive additional sensor data of one or more locations within the environment.

Although FIGS. 2A and 2B display sensors 203*a* and 203*b* as image capture devices, other types of sensors are also possible. The additional sensors may be badge reading devices, microphones, voice recognition sensors, fingerprint scanners, iris scanners, IMUs, or other types of sensors that can obtain sensor data from within an environment. Although only one additional sensor 203*a* and 203*b* is displayed, the environments 200*a* and 200*b* could include multiple additional sensors. Furthermore, the multiple additional sensors 203*a* and 203*b* may be multiple types of sensors. Even further, varying amounts of each type of sensor may also be included within an environment. For example, an environment may include four image capture devices, six microphones, one badge reader, zero fingerprint scanners, zero iris scanners, and any number of IMUs, in one embodiment. Other combinations of sensors within an environment are also possible.

The additional sensors 203*a* and 203*b* provide sensor data in addition to the point cloud data obtained from sensors 202*a* and 202*b*. The additional sensor data may be representative of a location, an actor, an object, or some other item within an environment. Point cloud data may be used in combination with the additional sensor data to determine attributes about one or more actors within an environment. Multiple types of sensor data may be used alone or in combination with the point cloud data to determine attributes. For example, image data from an image capture device and audio data from a microphone may both be used in combination with point cloud data representative of an actor to determine attributes about the actor. The additional sensor data may be mapped to point cloud data for an actor because both sets of data correspond to the same location.

FIGS. 2A and 2B display multiple locations, including a first location 214*a* and 214*b*, a second location 224*a* and 224*b*, and a third location 225*a* and 225*b*. A location may span one or more physical spaces within an environment. Some locations (such as locations 214*a*, 214*b*, 224*a*, and 224*b*) may include one or more actors, objects, and/or other items, whereas other locations (such as locations 225*a* and 225*b*) may not. In the displayed embodiment, third locations 225*a* and 225*b* may be blind spots where an actor cannot be detected by the one or more sensors within the environment. Other types of locations may also be possible.

In FIGS. 2A and 2B, a first actor 210*a* and 210*b* and a second actor 220*a* and 220*b* are displayed. An actor may be a person, robotic device, or some other item that can move and has attributes that can be identified within an environment. An actor may be stationary at a location, or moving from a first location to a second location. In the displayed embodiments of FIGS. 2A and 2B, the first and second actors are at different locations. In some embodiments, the first and second actor may be different actors detected at different times, while in other embodiments, the first and second actor may be the same actor detected at different locations at different times. In other embodiments, the first and second actor may be the same actor (or different actors) detected at the same location, but at different times.

In FIGS. 2A and 2B, the first actor 210a and 210b detected at a first location 214a and 214b at a first time is the same actor as the second actor 220a and 220b, who is detected at a second location 224a and 224b at a second time later than the first time. While the first and second actors in FIGS. 2A and 2B have the same pose at the two different locations, in other embodiments, the second actor 220a and 220b may have a different pose from the first actor 210a and 210b, but still be the same actor. The first actor and second actor may be determined to be the same actor based on attributes determined for each actor.

Attributes for an actor may be determined based on point cloud data and sensor data detected at a particular location. Attributes may be determined based on multiple types of additional sensors in combination with point cloud data, or alternatively, just one type of additional sensor data in combination with point cloud data. The additional sensor data can be used in combination with the point cloud data by mapping the additional sensor data to the point cloud data that corresponds to an actor at the same, or a similar, location corresponding to the additional sensor data. The attributes may be used to determine whether or not the first actor is the second actor.

For example, in FIG. 2A (and also for FIG. 2B), point cloud data representative of the first actor 210a at first location 214a is received from depth sensor 202a in the environment 200a by the system. Additional sensor data (such as image data) representative of location 214a is received from additional sensor 203a by the system. The additional sensor data may be mapped to the point cloud data for actor 210a because both sets of data correspond to location 214a. Once mapped, the additional sensor data can be used alone or in combination with the point cloud data to determine attributes, such as gaze direction 217a, about the first actor 210a.

At a later time, the system may receive a second set of point cloud data representative of the second actor 220a at a second location 224a from depth sensor 202a in the environment 200a. Second additional sensor data (such as image data) representative of location 224a may also be received from additional sensor 203a by the system at the later time, and mapped to the second set of point cloud data for actor 220a due to the corresponding location 224a. Once mapped, the second additional sensor data may be used alone or in combination with the second point cloud data to determine attributes (such as gaze direction 227a) about the second actor 220a. If attributes for the second actor match the corresponding attributes for the first actor (such as gaze direction 227a matches gaze direction 217a), then the system may determine that the second actor 220a is the same actor as the first actor 210a detected at a later time. Thus, point cloud data and additional sensor data can be used to improve monitoring of actors within an environment.

FIG. 2B displays robotic device 230b. The operation of the robotic device 230b may be adjusted based on the determination that actor 220b is actor 210b. The robotic device 230b may adjust operations including navigation of the robotic device 230b, teleconferencing between the robotic device 230b and actor 210b, telepresence of a robotic device user with the actor 210b, or the execution of one or more tasks. Further, in response to the determination that actor 220b is actor 210b, the robotic device 230b may adjust its operation by doing nothing and/or stopping what the robotic device 230b was previously doing. Alternatively, the robotic device 230b may adjust its operation based on the determination that the first actor 210b is not the second actor 220b in the same, or similar, manners described above. Other operation adjustments by the robotic device 230b are also possible.

The operation of the robotic device 230b may be adjusted based on various data besides, or in addition to, the determination that the first actor 210b is the second actor 220b. For example, robotic device operation may be adjusted based on attribute data (such as gaze direction 217b) for the first actor 210b, attribute data (such as gaze direction 227b) for the second actor 220b, attribute data of another actor (not displayed), historical information indicating previous attributes of an actor, or other data. Robotic device operation may be adjusted based on a combination of the aforementioned data. Other criteria are also possible for adjusting robotic device operation.

The system 104 of FIG. 1 may provide information indicating a determination that the first actor 210b is the second actor 220b to a user/operator that is controlling or assisting the robotic device 230b. The system 104 may rely on a communication link (such as link 120) in connection with a computing device (not shown) of the user or operator of the robotic device 230b. The computing device may be a computer, personal computer, laptop, phone, PDA, tablet, mobile device, wearable computing device, or some other computing device of the user or operator. Other embodiments for providing the information to the user/operator controlling or assisting the robotic device are also possible.

Sensors 203a and/or 203b may be adjusted based on the determination that the first actor 210a and/or 210b is the second actor 220a and/or 220b, respectively. In the displayed embodiment, sensors 203a and/or 203b may zoom, pan, tilt, or adjust in some other manner in response to the determination that the first actor is the second actor. Other types of additional sensors 203a and/or 203b may adjust their operation in a different manner in response to the determination that the first actor is the second actor. Adjustments to sensors 203a and/or 203b in response to determined attribute data for the first actor, determined attribute data for the second actor, a determination that the first actor is not the second actor, or some combination of the above, may also be possible.

Although FIG. 2B displays sensors 202b and 203b as being remotely located from the robotic device 230b, in some embodiments, robotic device 230b may include one or more sensors 202b to detect actors 210b and 220b, as well as one or more sensors 203b to obtain sensor data for locations 214b and 224b. In some embodiments, the robotic device 230b uses its own attached sensors to detect and determine if actor 220b is actor 210b. Alternatively, the robotic device 230b may receive communications from system 104 (see FIG. 1) indicating whether actor 220b is actor 210b. In another embodiment, the robotic device 230b may receive sensor data from system 104 (see FIG. 1) and then determine whether actor 220b is actor 210b. Other methods of determining whether actor 220b is actor 210b for the robotic device 230b are also possible.

In some embodiments, the robotic device 230b may be the detected actor. In these cases, the robotic device may have characteristics similar to that of the detected actors 210b and 220b. For example, the robotic device 230b may be stationary at a first location, moving from a first location to a second location, or a combination of both over a period of time. The attributes of the robotic device 230b may be similar to the attributes of the actor 210b and the attributes of the actor 220b. In particular, the system may identify if a robotic device at a first location is the same robotic device detected at a second location at a later time based on the attributes of the detected robotic devices. The system may also provide a signal indicating the detected robotic devices are the same robotic device based on the robotic devices having the same attributes.

Figure 3A:
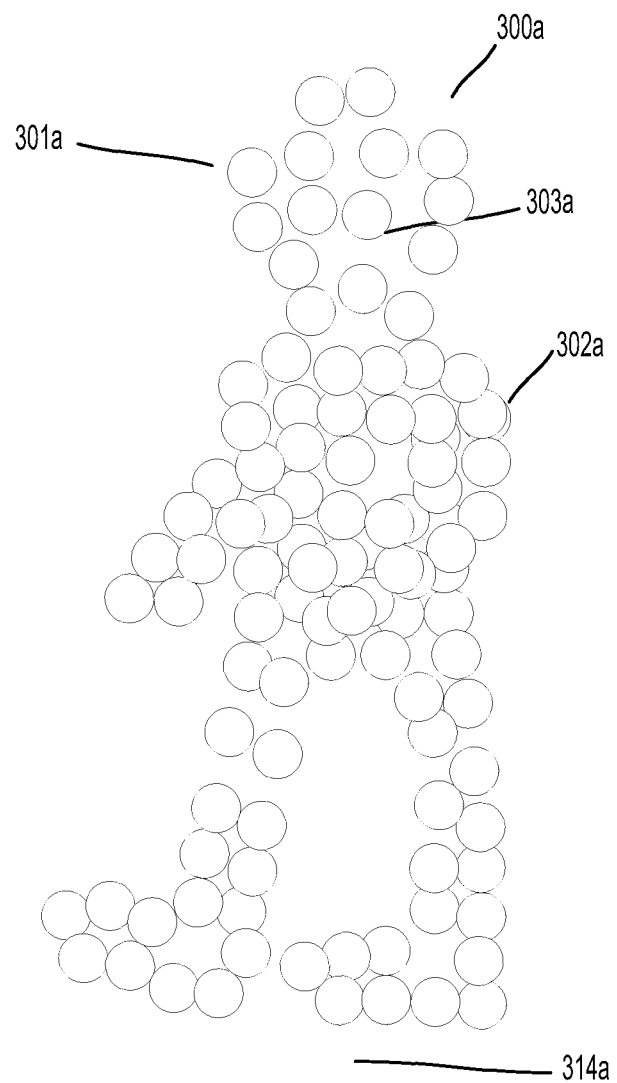
FIG. 3A illustrates an example point cloud representative of an actor, according to an example embodiment.

FIG. 3A displays an example point cloud representative of an actor within an environment, according to an embodiment. FIG. 3A includes point cloud data 300a representative of an actor within an environment. The received point cloud data includes various portions of point cloud data 301a, 302a, and 303a. The point cloud data 300a may be received at a location 314a within the environment. In other embodiments, the point cloud may include more, fewer, and/or different portions of point cloud data. Additionally, the point cloud data may be received for an actor at different locations or more locations than the location shown for FIG. 3A.

Point cloud data 300a may include portions of point cloud data representative of different parts of the actor. Point cloud data 301a may be representative of the head of the actor, while point cloud data 302a may be representative of the body of the actor. In FIG. 3A, the body of the actor may include the actor's arms, legs, torso, and/or other parts. However in other embodiments, the body may refer to fewer parts of the actor (such as the torso) while other parts of the actor may be considered separate portions of point cloud data (such as the arms, legs, etc.). Point cloud data 303a may be representative of a face of the actor.

The point cloud data 300a includes a plurality of points received from one or more sensors within an environment, such as sensors 102, 202a, and/or 202b from FIGS. 1, 2A, and 2B, respectively. Each received point may represent a point on the surface of the actor. The sensor may provide a cluster of points in a particular area of the actor. The cluster of points may then be representative of a part of the actor. For example, the cluster of points identified by 301a may be representative of the head of the actor.

Determining information about the actor based on the received, clustered point cloud data 300a may be challenging for at least three reasons. First, the point cloud data received from the one or more sensors may be sparse. Thus, the point cloud data may not be as rich, as detailed, or have as many points as other sensor data for determining information about an actor.

Second, the point cloud data may have a non-uniform density. Some stripes of received point cloud data may have a high density. But other stripes of received point cloud data may have a low density. Thus, techniques for determining additional information based on the received point cloud data may accommodate point cloud data with varying density values.

Third, the received point cloud data may be prone to blind spots. Blind spots (such as locations 225a and 225b from FIGS. 2A and 2B) occur when a portion of the environment cannot be sensed by the one or more sensors (such as sensors 102, 202a, and/or 202b displayed in FIGS. 1, 2A, and 2B, respectively) within the environment. A blind spot may occur because a sensor is not present at a portion of the environment.

Alternatively, blind spots may occur due to obstacles and/or occlusions. For example, a blind spot may occur at a portion of the environment due to an object blocking a portion of the environment from sensing by a sensor. For another example, a blind spot may occur at a portion of the environment because another actor or robotic device is located in between the sensor and the portion of the environment. Thus, if an actor was located at a portion of the environment while the robotic device (or another actor) was located in between the sensor and the actor, the robotic device may cause the portion of the environment to become a blind spot. The blind spot may prevent the actor from being detected by the sensor. Additional sensors may be added to the environment to reduce blind spots.

Because the received point cloud data is sparse, has a non-uniform density, and is prone to blind spots, it can be challenging to determine additional information about an actor based on the received point cloud data. Thus, techniques for determining information about an actor using the point cloud data may accommodate the characteristics and challenges of the point cloud data. One technique that accommodates these challenges is to collect and process additional sensor data (such as image data) of the location (such as location 314a) of the actor. The image data may be processed in combination with the point cloud data to determine attributes of the actor.

Figure 3B:
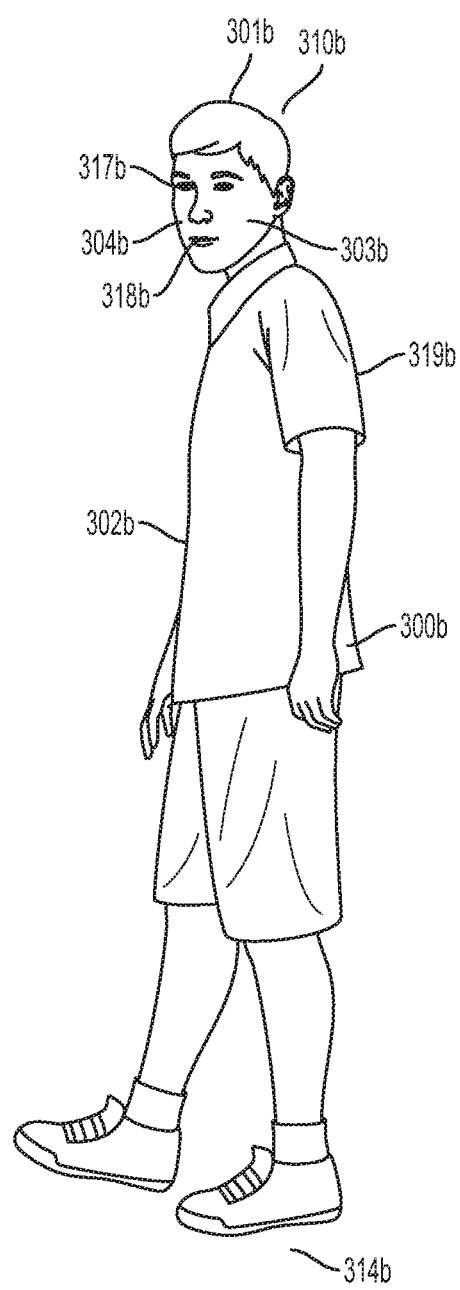
FIG. 3B illustrates example image data representative of a location within an environment, according to an example embodiment.

FIG. 3B displays example image data representative of a location within an environment, according to an example embodiment. FIG. 3B displays image data 310b representative of a location 314b. The image data 310b includes image data of the actor 300b. The image data of actor 300b includes image data for parts of the actor, including image data 301b, 302b, 303b, and 304b. Attributes 317b, 318b, and 319b can be determined about the actor based on the image data 310b.

Attribute 317b may indicate an eye color of the actor, while attribute 318b may indicate a facial gesture of the actor. Attribute 319b may describe an attire color of the actor. In other embodiments, the image data may include fewer, more, and/or different image data. Additionally, the image data may be received from a different location or more locations than the location shown in FIG. 3B. Further, the system may determine more, fewer, and/or different attributes about the actor.

Image data 310b displays location 314b. Location 314b may be within a physical space of the environment. Alternatively, location 314b may span multiple physical spaces within the environment. The image data of location 314b may also include portions, or all, of one or more objects (such as actors) at the location 314b.

In FIG. 3B, image data 310b includes image data for an actor 300b at location 314b. In some embodiments, the image data 300b may include a portion, or all, of the actor 300b. In the displayed embodiment, image data 300b includes image data 301b representative of the head of the actor and image data 302b representative of the body of the actor. Image data 301b includes image data 303b representative of the face of the actor and image data 304b representative of one or more facial features of the actor. Image data of the actor may be representative of more, fewer, and/or different parts of an actor than what is displayed in FIG. 3B. Image data 310b may also include image data for multiple actors at location 314b, in some embodiments.

When the image data 310b includes one or more objects (such as actors) at location 314b, the system may also have received point cloud data for some or all of the objects at location 314b. For objects where the system has received point cloud data, the corresponding image data for the objects may be mapped to point cloud data for the one or more objects within the image data. The mapping may be done based on the location 314b. Other methods of mapping image data for objects (such as actors) at a location 314b to corresponding point cloud data for the objects may also be possible.

For example, referring to FIGS. 3A and 3B, the system (such as system 104 from FIG. 1) may receive image data 310b for location 314b including image data 300b representative of an actor at location 314b. At a same or similar time, the system may also receive point cloud data 300a representative of an actor at location 314a. The location 314a may be the same as, or nearby, location 314b. The system may determine that the actor at location 314b and the actor at location 314a are the same actor. Thus, the system may map the image data 300b representative of the actor at location 314b to the point cloud data 300a representative of the actor at location 314a. By mapping the image data 300b to point cloud data 300a, the system may then make inferences about point cloud data 300a, including determining attributes about the actor based on the additional sensor data.

Although FIG. 3B displays image data 310b that is associated (mapped) with point cloud data 300a, other types of additional sensor data may be associated with point cloud data 300a based on locations 314b and 314a to determine attributes about an actor. For example, audio data of one or more actors within an environment detected by one or more microphones in the environment may be associated with point cloud data 300a to determine attributes of an actor. For another example, a badge reader may be used as an additional sensor to detect badge identification data to map with point cloud data 300a to determine one or more attributes about an actor. Other types of data from other types of sensors (such as voice recognition sensors, fingerprint scanners, iris scanners, or other types of sensors) may be associated with point cloud data 300a to determine attributes about an actor.

In FIG. 3B, attributes 317b, 318b, and 319b may be identified for the actor based on image data 310b. In FIG. 3B, attribute 317b may indicate an eye color of the actor. The eye color 317b of the actor may be black, brown, blue, green, or some other eye color. Attribute 318b may describe a facial gesture of the actor, such as whether or not the actor is smiling. Other facial gestures may also be used as an attribute. Attribute 319b may be an attire color of clothes worn by the actor, such as a shirt color. Other attributes may also be possible.

In some examples, the system may identify certain attributes of an actor to be permanent attributes, while identifying other attributes of the actor to be temporary attributes. Examples of permanent attributes may include fingerprint scans, iris scans, eye color, and/or other attributes that the system may consider impossible, or very unlikely, to change over time. In FIG. 3B, the eye color 317 of the actor may be considered a permanent attribute. Whether an attribute is permanent may be a user-configured option. For example, in some embodiments, the eye color attribute 317 may not be considered a permanent attribute because the attribute may change for a person (such as a person wearing contact lenses with different colors).

A temporary attribute may be assigned an associated expiration time that occurs after associated detection time of the temporary attribute. The detection time may represent the time at which the attribute was detected, while the expiration time may represent the time at which the system no longer considers the attribute valid. The expiration time may correspond with a time at which the attribute is expected to have changed from when the attribute was first detected (such as the detection time). A remaining time may be the difference between the current time and the expiration time.

In FIG. 3B, attributes 318b and 319b may be temporary attributes. Attribute 318b may indicate whether the actor is smiling, while attribute 319b may describe the color of the actor's shirt. The system may assign a detection time and an expiration time to a temporary attribute. For example, attributes 318b and 319b may both have a detection time of 9:00 AM on January 25. The system may assign an expiration time to attribute 318b of 9:01 AM on January 25 and an expiration time of 9:00 AM on January 26 to attribute 319b. If the current time is 9:00 AM on January 25, then the remaining time for attribute 318b is one minute, while the remaining time for attribute 319b is 24 hours. As the current time changes and approaches the expiration time, the corresponding remaining time decreases.

The system may assign an expiration time of 9:01 AM to attribute 318b because the system expects the facial gesture of the actor 318b to change after one minute. Similarly, the system may sign an expiration time of 9:00 AM on January 26 to attribute 319b because it is unlikely that the color of the shirt of the actor will change on the day of January 25. The system may use different criteria to assign an expiration time to a temporary attribute. Different temporary attributes from 318b and 319b are also possible. Examples of other temporary attributes include gaze direction, what an actor recently said, motion data of an actor, location of an actor, attire color, and/or other attributes of an actor that are likely to change over time.

The system may assign expiration times to attributes based on criteria that improve the accuracy of the determination that a second actor is the first actor based on matching attributes. Thus, expiration times may be assigned to times corresponding to times where an attribute is likely to have changed. When matching temporary attributes of the second actor and the first actor, the system may require that the matching of attributes is done prior to the expiration time of the temporary attributes. Further, the system may consider temporary attributes of the second actor and the first actor that are matched after an expiration time to be invalid. In some embodiments, the system may transmit a signal and/or information indicating the second actor is the first actor based on matching temporary attributes prior to the corresponding expiration times. In other embodiments, the system may consider transmission of these signals and/or information after the corresponding expiration times to be an invalid transmission and/or determination. However, other determination and/or transmission policies for attributes with expiration times are also possible.

Figure 4:
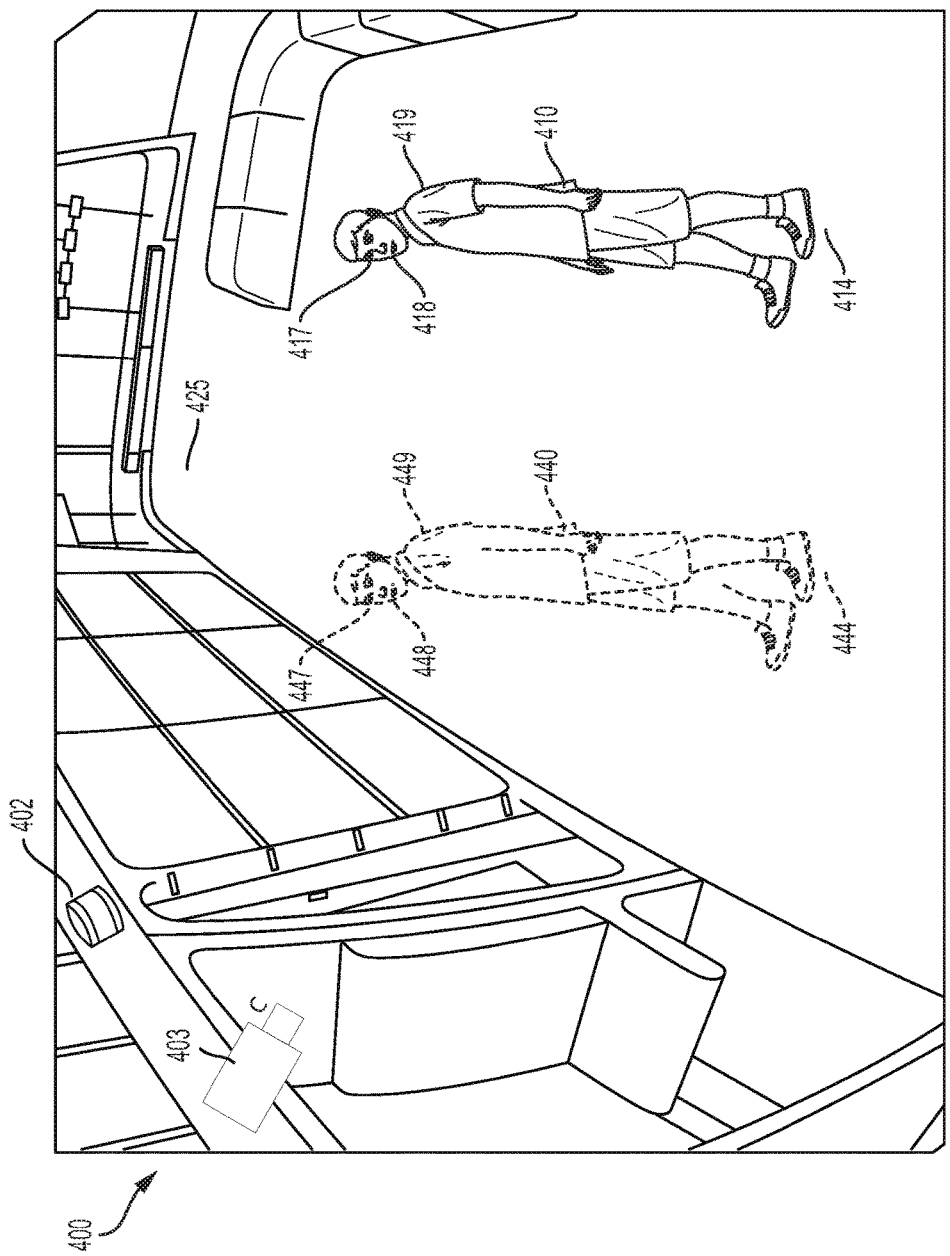
FIG. 4 illustrates another example environment with an actor, according to an example embodiment.

FIG. 4 displays an example environment of the system determining that a second actor is the same actor as the first actor, according to an embodiment. FIG. 4 displays 414 environment 400, which includes a spinning LIDAR sensor 402 and an image capture device 417403. Environment 400 includes a first actor 410 at a first location 414, a second actor 440 at a second location 444, and a third location 425. The first actor 410 has an eye color 417, facial gesture 418, and a shirt color 419, while the second actor has an eye color 447, a facial gesture 448, and a shirt color 449. The second actor 440 is drawn in a dotted line to indicate that the second actor 440 is detected at a later time than the first actor 410. Other embodiments may include more, fewer, and/or different sensors, actors, locations, and/or attributes.

The system may rely on confidence values when determining whether a second actor 440 is the first actor 410 based on matching attributes of the two actors. A confidence value may represent the probability or likelihood that the second actor is the first actor. The system may determine that the second actor is the first actor when the confidence value exceeds a threshold. The threshold may be a value configured by the system and/or user of the system. Confidence values representing the probability that a second actor is the first actor may be determined based on matching attributes of the second actor 440 with the first actor 410.

When the system matches attributes of two actors to determine a confidence value, the system may assign weights to the attributes being matched. By assigning weights to attributes, the system can take certain attributes into greater consideration than other attributes. For example, a matching attribute that is very likely to indicate that the second actor is the first actor (such as fingerprints) can be given a much larger weight than a matching attribute that isn't likely to indicate on its own that a second actor is a first actor (such as shirt color 419, 449).

Additionally, the assigned weight of a temporary attribute may decrease as the expiration time approaches and corresponding remaining time decreases. A temporary attribute weight may decrease linearly, nonlinearly, exponentially, or based on some other pattern with respect to the decreasing remaining time for the temporary attribute. Alternatively, a temporary attribute weight may remain constant until the expiration time. At the expiration time, the temporary attribute weight may be considered invalid, meaning the attribute does not factor into the confidence value determination. Temporary attribute weights may decrease at different rates. Thus, a first temporary attribute (such as facial gesture 418) may decrease at a different rate from a second temporary attribute (such as shirt color 419).

In FIG. 4, actor 410 may have been detected by sensors 402 and 403 at a detected time of 9:00 AM on January 25. The system may have received point cloud data and image data for the actor 410, similar to the point cloud data 300*a* shown in FIG. 3A and image data 31*b* shown in FIG. 3B. The system may have mapped the received image data to the received point cloud data due to the location of the two sets of data both corresponding to location 414.

The associated image data and point cloud data may then be used to determine attributes 417, 418, and 419 at the detected time of 9:00 AM on January 25. Thus, attributes 417, 418, and 419 may also have a detected time of 9:00 AM on January 25. The system may assign expiration times to attributes 418 and 419, while considering the eye color attribute 417 a permanent attribute. The facial gesture attribute 418 may have an expiration time one minute later at 9:01 AM on January 25, while the shirt color attribute 419 may have an expiration time 24 hours later at 9:00 AM on January 26.

Actor 440 may have been detected by sensors 402 and 403 at a detected time of 9:10 AM on January 25. Similar to actor 410, the system may have received point cloud data and image data for the actor 440 that corresponds to point cloud data 300*a* shown in FIG. 3A and the image data 310*b* shown in FIG. 3B. The system may have mapped the received image data of location 444 to the point cloud data for actor 440 based on the location of the two sets of data corresponding to location 444.

The associated image data and point cloud data for actor 440 may then be used to determine attributes 447, 448, and 449 at the detected time of 9:10 AM on January 25. Thus, attributes 447, 448, and 449 may also have a detected time of 9:10 AM on January 25. The system may then compare the attributes 447, 448, and 449 to the attributes 417, 418, and 419 to determine if the second actor 440 is the first actor 410 being detected at a later time and different location. While the comparison and determination in the displayed embodiment is executed at the time the second actor's attributes are detected (9:10 AM on January 25), in other embodiments, the comparison and determination of whether the second actor is the first actor could be done at a later time.

The system may determine that the eye color 447 and the eye color 417 are permanent attributes without expiration times, and thus can be compared. During the comparison, the system may determine that the eye color 447 and eye color 417 match. The system may also determine that shirt color 449 and shirt color 419 are temporary attributes that can be compared because attribute 419 has not expired (before the expiration time of 9:00 AM on January 26). Further, the system may determine that the shirt colors 449 and 419 match.

Last, the system may determine that the facial gestures 448 and 418 are temporary attributes that cannot be compared because attribute 418 is expired. Specifically, the current time of 9:10 AM on January 25 is past the expiration time of 9:00 AM on January 25 for attribute 418. Thus, facial gesture attributes 418 and 448 may not factor into the determination of the confidence value.

Once determining which attributes of the second actor and first actor match, the system may then assign weights to the matching attributes to determine a confidence value. In the displayed embodiment, the system may assign a weighted score of "40" to eye color 417 and a weighted score of "20" to shirt color 419. In some embodiments, if the detection time of attribute 449 (9:10 AM on January 25) had been closer to the expiration time of attribute 419 (9:00 AM on January 26), the shirt color weighted score may have been lower than "20." The system may then combine the weighted scores to determine a confidence value of "60", which may correspond to a 60% likelihood that the second actor is the first actor.

The system may then determine the second actor 440 is the first actor 410 when the confidence value exceeds a threshold. In the displayed embodiment, if the threshold is 55%, then the system may determine the second actor 440 is the first actor 410 because the confidence value of 60% exceeds the threshold of 55%. In other embodiments, if the threshold is above the confidence value (such as 80%), the system may determine that more attributes need to be considered and/or matched before determining that the second actor is the first actor. Alternatively, the system may determine that the second actor is not the first actor.

In some embodiments, the system may also have a second threshold below the first threshold for determining that the second actor is not the first actor. In particular, if the confidence value is below the second threshold, the system may determine the second actor is not the first actor. If the confidence value is between the first and second threshold, then the system may determine that more attributes need to be compared to determine whether or not the second actor is the first actor. Other methods for determining thresholds, confidence values, and/or weights to determine whether or not the second actor is the first actor may also exist.

In FIG. 4, the system may have been unable to detect actor 410 when actor 410 was in a blind spot. In particular, actor 410 may have left location 414 and been at location 425 at 9:05 AM on January 25. Because location 425 may be a blind spot, actor 410 may have gone undetected by one or more of sensors 402 and/or 403 before being detected again at location 444 as actor 440. The system, as a result, may then compare the detected second attributes 447, 448, and 449 of actor 440 to the first detected attributes 417, 418, and 419 of actor 410 to determine if actor 440 is actor 410. Other scenarios may also arise in which the system determines whether or not a second actor 440 detected at a second location 444 at a later time is the same actor as a first actor 410 detected at a first location 440 at an earlier time.

In some embodiments, sensors 402 and 403 of environment 400 may be configured with respect to location 425 such that location 425 is a blind spot for point cloud sensors 402, but not for additional sensors 403. In these cases, additional sensor data representative of location 425 may be received from one or more sensors 403 by the system for an actor at location 425. Attributes of the actor at location 425 may then be determined based on the received additional sensor data for location 425. The determined attributes may then be compared to the first set of attributes 417, 418, and 419 for the first actor 410 at location 414 to determine if the first actor 410 moved from location 410 to location 425. Similar to actor 440, the system may rely on attribute weights and a calculated confidence value to make this determination. The system may then provide a signal and/or information indicating the first actor 410 moved from location 410 to location 425.

In another embodiment, the system may match attributes to grant an authorized actor access to a restricted area without requiring additional badge swipes at a badge reader. In FIG. 4, for example, actor 410 may have initially entered the environment by swiping a badge identification card at a badge reader. Although not displayed, the system may have received the additional sensor badge identification card data for the first actor 410, and determined an attribute for the actor 410 indicating authorization to access all restricted areas of the environment. As a result, if the actor 410 moves to a new location within the environment (such as location 444) with a badge reader (not displayed), the system can determine that the actor at location 444 is the same actor 410 that is authorized to access all restricted areas of the environment. Thus, the system can grant access to actor 410 at the new location without requiring an additional badge swipe. Other embodiments are also possible.

Figure 5:
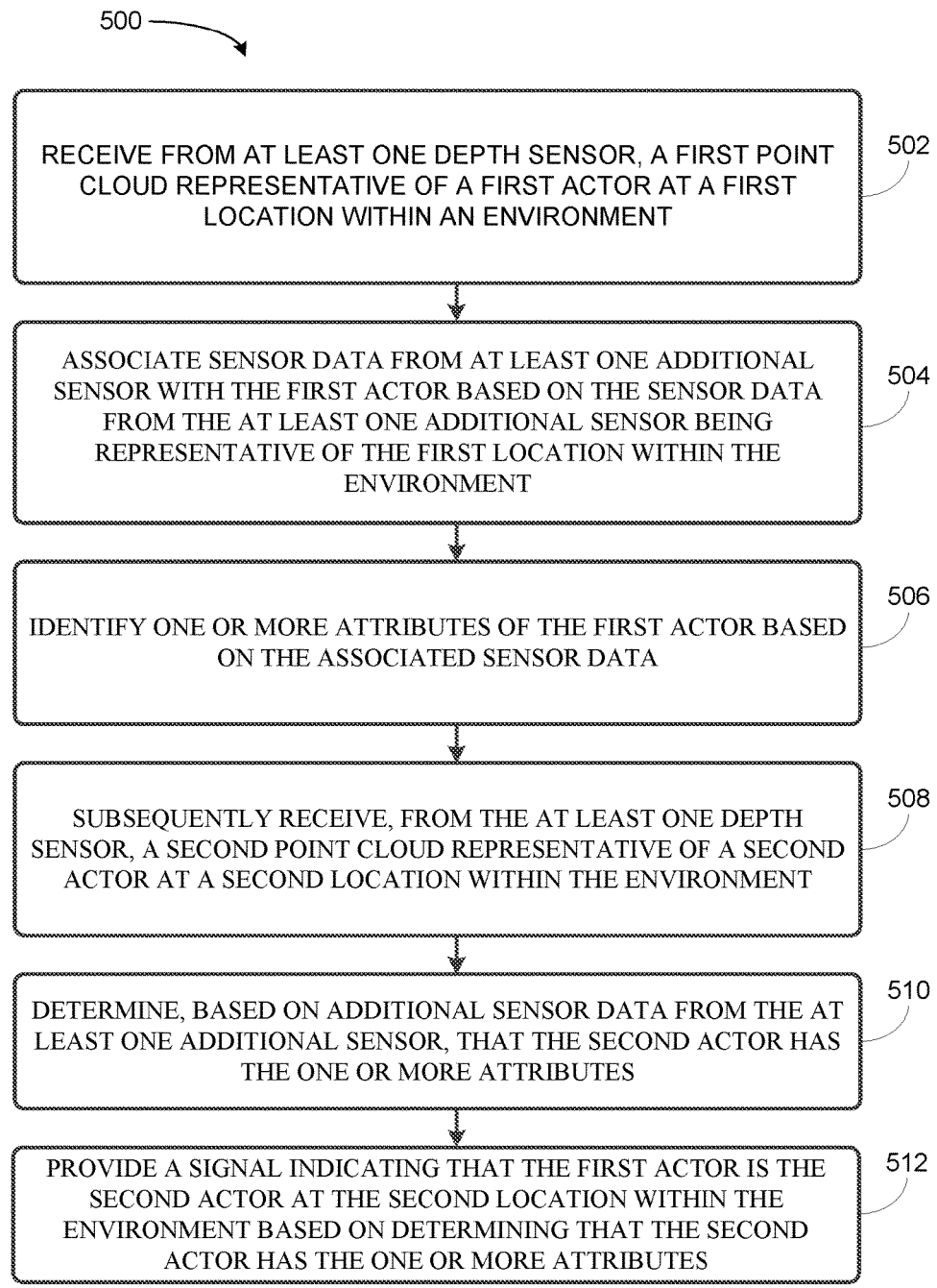
FIG. 5 is a block diagram of an example method, according to an example embodiment.

FIG. 5 illustrates a flowchart showing the method 500 that may allow for determining an actor based on detected attributes from sensors in an environment, according to an example embodiment. The method 500 may be executed by a control system, such as computing system 104 shown in FIG. 1. Alternatively, the method may be executed by a robotic device, such as the robotic device 230b displayed in FIG. 2B. Other devices or systems may execute method 500 in other embodiments.

Furthermore, it is noted that the functionality described in connection with the flowcharts described herein can be implemented as special-function and/or configured general-function hardware modules, portions of program code executed by a processor for achieving specific logical functions, determinations, and/or steps described in connection with the flowchart shown in FIG. 5. Where used, program code can be stored on any type of computer-readable medium, for example, such as a storage device including a disk or hard drive.

In addition, each block of the flowchart shown in FIG. 5 may represent circuitry that is wired to perform the specific logical functions in the process. Unless specifically indicated, functions in the flowchart shown in FIG. 5 may be executed out of order from that shown or discussed, including substantially concurrent execution of separately described functions, or even in reverse order in some examples, depending on the functionality involved, so long as the overall functionality of the described method is maintained.

As shown by block 502 of FIG. 5, method 500 may involve receiving from at least one depth sensor, a first point cloud representative of the first actor at a first location within an environment. In some examples, the point cloud data may be received by one or more LIDAR sensors attached at a fixed location within the environment, located on a mobile robot in the environment, and/or located elsewhere in the environment. In other examples, the point cloud data may include a plurality of points which represent the surface of the detected actor. In some other examples, the received point cloud data may be sparse with a non-uniform density. In additional examples, techniques may be used to accommodate the sparse point cloud data with a non-uniform density.

Method 500 may further involve associating sensor data from at least one additional sensor with the first actor based on the sensor data from the at least one additional sensor being representative of the first location within the environment, as displayed by block 504 in FIG. 5. In some examples, the at least one additional sensor may be an image capture device and the sensor data may be image data. In additional examples, the image data may be received by one or more cameras. In other examples, the one or more cameras may be attached at a fixed location within the environment, located on a mobile robot in the environment, and/or located elsewhere in the environment. In some other examples, the additional data may include multiple types of data (such as image data and badge identification data) from multiple types of additional sensors (such as image capture devices and badge reading devices, respectively).

Method 500 may also involve identifying one or more attributes of the first actor based on the associated sensor data, as displayed by block 506 in FIG. 5. In some examples, the attributes of the first actor may include attire color, facial gestures, gaze direction, and badge identification number, and/or other attributes. In additional examples, the attributes of the actor may have an expiration time, such as gaze direction, attire color, or other attributes. In other examples, the identified attributes may be permanent.

The method 500 may additionally include subsequently receiving, from the at least one depth sensor, a second point cloud representative of a second actor at a second location within the environment, as shown by block 508 in FIG. 5. In some examples, the system is unable to determine whether the second point cloud is representative of the first actor corresponding to the first point cloud. In additional examples, the point cloud of the second actor may have a different body orientation, body gesture, motion, configuration, or other point cloud data characteristic, than the first point cloud data.

Method 500 may also include determining, based on additional sensor data from the at least one additional sensor, that the second actor has the one or more attributes, as can be seen by block 510 in FIG. 5. In some examples, the system may determine the second actor has the one or more attributes prior to an expiration time of the one or more attributes. In additional examples, the system may assign one or more weights to the one or more attributes and determine a confidence value indicating the probability that the second actor is the first actor. In some additional examples, the system may determine the second actor is the first actor based on the confidence value exceeding a threshold.

Method 500 may also involve providing a signal indicating that the first actor is the second actor at the second location within the environment based on determining that the second actor has the one or more attributes, as shown by block 512 in FIG. 5. In some examples, information indicating the first actor is the second actor may be provided to a user or an operator of a robotic device. In additional examples, the user or operator may adjust the operation of the robotic device based on the provided information indicating the first actor is the second actor. In other examples, the robotic device may be an actor detected within the environment.

Although not displayed in FIG. 5, method 500 may include additional steps, such as determining that the first actor is the second actor and adjusting operation of a robot based on the determination that the first actor is the second actor. In some examples, the navigation of the robot may be adjusted based on the determination that the first actor is the second actor. However, the robot could be adjusted to operate in a different way in response to the determination that the first actor is the second actor.

Various applications and environments using sensors to determine an actor in the environment based on detected attributes are possible for the disclosed systems and methods. For example, some environments where determination of the actor based on detected attributes may be applicable include manufacturing facilities, mailing or shipping facilities, airports, hospitals, or other environments employing sensors for detecting actors. Furthermore, other applications where determination of the actor based on detected attributes within an environment may be applicable include construction, shipping, manufacturing, healthcare, and/or other applications using environments with sensors. Other applicable environments and applications for the disclosed systems and methods may also be possible.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:

receiving, at a first time, from at least one depth sensor, and by a control system communicatively connected to the at least one depth sensor, a first point cloud representative of a first actor at a first location within an environment;

associating, by the control system, sensor data received by the control system from at least one additional sensor with the first actor based on the sensor data from the at least one additional sensor being representative of the first location within the environment;

identifying, by the control system, one or more attributes of the first actor based on the associated sensor data;

determining, by the control system, that the first actor is undetectable in a second point cloud received by the control system from the at least one depth sensor at a second time later than the first time;

receiving, by the control system, at a third time later than the second time, and from the at least one depth sensor, a third point cloud representative of a second actor at a second location within the environment;

determining, by the control system, based on additional sensor data received by the control system from the at least one additional sensor, that the second actor has the one or more attributes; and based on determining, by the control system, (i) that the first actor is undetectable in the second point cloud and (ii) that the second actor has the one or more attributes, re-identifying the first actor as the second actor.

2. The method of claim 1 further comprising:
determining one or more corresponding expiration times for the one or more attributes of the first actor;
determining, based on the additional sensor data from the at least one additional sensor, that the second actor has the one or more attributes prior to the one or more expiration times; and
re-identifying the first actor as the second actor based on determining that the second actor has the one or more attributes prior to the one or more expiration times.

3. The method of claim 1 further comprising:
assigning one or more corresponding weights to the one or more attributes of the first actor;
decreasing the one or more corresponding weights of the one or more attributes in response to one or more corresponding remaining times decreasing, wherein the one or more corresponding remaining times indicate an amount of time from a current time to one or more later, corresponding expiration times;
determining a confidence value representative of a probability that the second actor is the first actor based on the one or more corresponding weights of the one or more attributes; and
re-identifying the first actor as the second actor based on the confidence value exceeding a threshold.

4. The method of claim 3 further comprising:
decreasing a first weight of a first attribute of the one or more attributes at a first rate; and
decreasing a second weight of a second attribute of the one or more attributes at a second rate, wherein the second rate is larger than the first rate.

5. The method of claim 1 further comprising:
identifying at least one of the one or more attributes as a permanent attribute; and
identifying at least one of the one or more attributes as a temporary attribute by assigning an expiration time to the temporary attribute.

6. The method of claim 1 further comprising:
navigating a robotic device based at least on the one or more attributes of the actor.

7. The method of claim 1 further comprising:
in response to re-identifying the first actor as the second actor, providing, by the control system, a signal indicating that the second actor is the first actor.

8. A non-transitory computer-readable medium storing instructions that are executable by one or more computing devices, wherein executing the instructions causes the one or more computing devices to perform functions comprising:
receiving, at a first time and from at least one depth sensor, a first point cloud representative of a first actor at a first location within an environment, wherein the one or more computing devices are communicatively connected to the at least one depth sensor;
associating sensor data received by the one or more computing devices from at least one additional sensor with the first actor based on the sensor data from the at least one additional sensor being representative of the first location within the environment;
identifying one or more attributes of the first actor based on the associated sensor data;
determining that the first actor is undetectable in a second point cloud received by the one or more computing devices from the at least one depth sensor at a second time later than the first time;
receiving, at a third time later than the second time and from the at least one depth sensor, a third point cloud representative of a second actor at a second location within the environment;
determining, based on additional sensor data received by the one or more computing devices from the at least one additional sensor, that the second actor has the one or more attributes; and
based on determining (i) that the first actor is undetectable in the second point cloud and (ii) that the second actor has the one or more attributes, re-identifying the first actor as the second actor.

9. The non-transitory computer-readable medium of claim 8, wherein executing the instructions further causes the one or more computing devices to perform functions comprising:
determining one or more corresponding expiration times for the one or more attributes of the first actor;
determining, based on the additional sensor data from the at least one additional sensor, that the second actor has the one or more attributes prior to the one or more expiration times; and
re-identifying the first actor as the second actor based on determining that the second actor has the one or more attributes prior to the one or more expiration times.

10. The non-transitory computer-readable medium of claim 9, wherein a first attribute of the one or more attributes with corresponding expiration times is a gaze direction of the actor.

11. The non-transitory computer-readable medium of claim 8, wherein executing the instructions further causes the one or more computing devices to perform functions comprising:
assigning one or more corresponding weights to the one or more attributes of the first actor;
decreasing the one or more corresponding weights of the one or more attributes in response to one or more corresponding remaining times decreasing, wherein the one or more corresponding remaining times indicate an amount of time from a current time to one or more later, corresponding expiration times;
determining a confidence value representative of a probability that the second actor is the first actor based on the one or more corresponding weights of the one or more attributes; and
re-identifying the first actor as the second actor based on the confidence value exceeding a threshold.

12. The non-transitory computer-readable medium of claim 8, wherein the first point cloud and the second point cloud have a non-uniform density.

13. The non-transitory computer-readable medium of claim 8, wherein the at least one additional sensor includes one or more image capturing devices.

14. The non-transitory computer-readable medium of claim 8, wherein executing the instructions further causes the one or more computing devices to perform functions comprising:
navigating a robotic device based at least on the one or more attributes of the actor.

15. The non-transitory computer-readable medium of claim 8, wherein executing the instructions further causes the one or more computing devices to perform functions comprising:
in response to re-identifying the first actor as the second actor, providing a signal indicating that the second actor is the first actor.

16. A robotic device comprising:
one or more processors; and
a memory storing instructions that when executed by the one or more processors cause the robotic device to perform functions comprising:
  receiving, at a first time and from at least one depth sensor, a first point cloud representative of a first actor at a first location within an environment;
  associating sensor data from at least one additional sensor with the first actor based on the sensor data from the at least one additional sensor being representative of the first location within the environment;
  identifying one or more attributes of the first actor based on the associated sensor data;
  determining that the first actor is undetectable in a second point cloud received from the at least one depth sensor at a second time later than the first time;
  receiving, at a third time later than the second time and from the at least one depth sensor, a third point cloud representative of a second actor at a second location within the environment;
  determining, based on additional sensor data from the at least one additional sensor, that the second actor has the one or more attributes;
  based on determining (i) that the first actor is undetectable in the second point cloud and (ii) that the second actor has the one or more attributes, re-identifying the first actor as the second actor; and
  adjusting operation of the robotic device based on re-identifying the first actor as the second actor.

17. The robotic device of claim 16, wherein the instructions further cause the robotic device to perform functions comprising:
  determining one or more corresponding expiration times for the one or more attributes of the first actor;
  determining, based on the additional sensor data from the at least one additional sensor, that the second actor has the one or more attributes prior to the one or more expiration times; and
  re-identifying the first actor as the second actor prior to the one or more expiration times.

18. The robotic device of claim 16, wherein the instructions further cause the robotic device to perform functions comprising:
  assigning one or more corresponding weights to the one or more attributes of the first actor;
  decreasing the one or more corresponding weights of the one or more attributes in response to one or more corresponding remaining times decreasing, wherein the one or more corresponding remaining times indicate an amount of time from a current time to one or more later, corresponding expiration times;
  determining a confidence value representative of a probability that the second actor is the first actor based on the one or more corresponding weights of the one or more attributes; and
  re-identifying the first actor as the second actor based on the confidence value exceeding a threshold.

19. The robotic device of claim 16, wherein the first point cloud and the second point cloud have a non-uniform density.

20. The robotic device of claim 16, wherein the instructions further cause the robotic device to perform functions comprising:
  granting the actor access to an area within the environment based on the one or more attributes of the actor, wherein access to the area is restricted to one or more authorized actors.

* * * * *